United States Patent [19]
Ruby
[11] 4,131,130
[45] Dec. 26, 1978

[54] PNEUMATIC PRESSURE CONTROL VALVE

[75] Inventor: Joseph H. Ruby, Glendale, Ariz.
[73] Assignee: Sperry Rand Corporation, New York, N.Y.

[21] Appl. No.: 816,837
[22] Filed: Jul. 18, 1977
[51] Int. Cl.[2] ........................ G05B 11/48; F16K 11/14
[52] U.S. Cl. ........................... 137/596.17; 137/625.64; 137/82
[58] Field of Search ................ 137/82, 625.64, 625.65, 137/596.17, 596

[56] References Cited

U.S. PATENT DOCUMENTS 3,712,339 1/1973 Bartholomaus ............. 137/625.64 X
3,874,405 4/1975 Thayer ........................ 137/625.64 X

*Primary Examiner*—Alan Cohan
*Attorney, Agent, or Firm*—Howard P. Terry

[57] ABSTRACT

A pneumatic control valve of the flapper type for controlling the resultant pneumatic pressure within a chamber from two sources of pressure in proportion to an electrical control signal is disclosed, wherein two flappers, one associated with a nozzle connected with one of said sources and the other associated with a nozzle connected with the other thereof, are resiliently coupled to a common electrically actuated armature such that at least at extreme controlled pressure rates, the resilient coupling permits one flapper to close its nozzle while permitting the other to continue to control the pressure rate from the other nozzle whereby to permit reducing the flapper-nozzle gap and to enlarge the nozzle area resulting in a very high valve gain and at the same time reducing quiescent pneumatic mass flow and increasing the transient pneumatic mass flow capability through said valve.

9 Claims, 6 Drawing Figures

PNEUMATIC PRESSURE CONTROL VALVE

BACKGROUND OF THE INVENTION

1. Field of the Invention

The present invention relates generally to fluid control valves and more particularly to hydraulic or pneumatic control valves of the flapper type for controlling the resultant pressure within a pressure chamber from two sources of pressure in proportion to an electrical control signal.

The control valve of the present invention while having general application in controlling fluid pressures, is particularly applicable in pneumatic pressure control systems such as pneumatic test apparatus for testing the various pneumatic pressure systems of aircraft. For example, it is useful in ground testing aircraft air data systems which in actual use provide aircraft control and display avionics in accordance with measures of the aircraft's altitude, vertical speed, airspeed, mach number, etc. Such test apparatus must therefore be capable of precisely duplicating pneumatic pressures on the ground normally encountered by an aircraft in flight over its entire flight profile. Typical of such pneumatic test apparatus is that disclosed in the present inventor's U.S. patent application Ser. No. 735,249, filed Oct. 26, 1976 now U.S. Pat. No. 4,086,804 entitled "Improved Pneumatic Pressure Supply System" and assigned to the same assignee as the present application. As disclosed therein, the desired pneumatic pressure and/or pressure rate to be supplied to the aircraft pneumatic pressure equipment under test is derived from a controlled or load pneumatic pressure volume through suitable pneumatic lines connected, for example, to the aircraft pneumatic sensors (which, of course, becomes part of the load volume). The pressure in the load volume is precisely controlled through a digital outer control loop servo and an inner analog electro-pneumatic closed loop servo. In the latter loop, the pressure in the volume is detected and converted into an electrical signal which signal is electrically summed with a pressure command signal from the digital outer loop, the resultant signal energizing an electrically actuated pressure control valve which in turn controls the pressure in the load volume (and in the aircraft pneumatic equipment) to maintain the digital electrical error signal zero, that is, the load volume pressure is maintained equal to that commanded. As disclosed in the above application, the control valve is of the flapper type wherein a flapper is electrically positioned in a gap defined by two nozzles, one connected to a source of positive pressure and the other to a source of negative pressure, e.g., a vacuum pump. The electric signal positions the flapper valve in the gap so as to control the amount of gas supplied to or withdrawn from the load volume to maintain the desired pressure therein.

As described in the above application, the pneumatic test equipment is a two channel system, one for supplying a controlled aircraft static pressure $P_s$ and one for supplying a controlled aircraft total pressure $P_t$ (dynamic plus static). In supplying steady state test pneumatic pressures corresponding, for example, to a very high altitude or a very high airspeed, it will be appreciated that very low and very high pressures respectively will have to be supplied and controlled. The flapper valves of the type schematically illustrated in the above application and in FIG. 6 of the present application, suffer from a design deficiency which, when called upon to control and maintain a steady state pressure, for example, incurs a large mass flow of air (or gas) through the valve and therefore an expensive large, high capacity vacuum pump is required. This quiescent large mass flow is wasted and if the positive pressure source is dry air or dry nitrogen, such "wasted" mass flow is very expensive. Further, with presently known flapper valve designs which inherently incur large mass flow, two large capacity vacuum pumps are required for air data test equipment, one for $P_S$ and one for $P_t$. If the wasted mass flow could be substantially reduced, only one vacuum pump would be required for both parameters in many applications. This is particularly desirable with portable or flight line test pneumatic equipment. Also, with a valve design which reduces quiescent wasted mass flow, the test equipment user can size his vacuum pump based on the aircraft pneumatic system volume and flight profile of the aircraft under test rather than on the mass flow requirements of the test equipment itself. As the orifice sizes and strokes are increased to increase the transient mass flow capability such as required by a flight line test system, the quiescent mass flow can be reduced.

SUMMARY OF THE INVENTION

The flapper type control valve of the present invention overcomes the wasted mass flow problems of the known designs and provides the valve designer with an additional design parameter that allows simultaneous increase in the transient mass flow while substantially reducing and under some control conditions substantially eliminating the quiescent or wasted mass flow. The improved high gain valve design does not affect the other desirable qualities of a flapper type control valve, such as its good pressure resolution, low hysteresis, low non-linearities, small dead-zone, fast response and the like.

In the preferred embodiments of the present invention, the single flapper is replaced by dual flappers, one associated with each pressure source nozzle and resiliently coupled to and driven by a single or common electrically actuated armature. With this arrangement, the flapper-nozzle quiescent gaps may be substantially decreased, thereby increasing the valve gain and the nozzle areas may be substantially increased such that when required large transient mass flows are achievable while reducing the wasted mass flow under steady-state pressure requirements. The high transient mass flow is achieved, when so commanded by the electrical control current to the armature control coils, because as the coil current is increased, one nozzle is completely shut off by its associated flapper, resulting in zero or substantially zero wasted mass flow, while the flapper associated with the other nozzle may continue to further open its nozzle gap, i.e., the transient gap, in accordance with further increases in coil current and thereafter, upon achieving the desired pressures and the control signal going to zero, the flapper returns to its normal position; the small quiescent gaps substantially reducing the mass flow through the valve. It will be noted that depending upon the particular application, the valve designer may select desired nozzle diameters and transient gap depending upon the transient mass flow requirements while maintaining the quiescent flapper-nozzle gaps very small and thereby substantially reducing the quiescent or wasted mass flow.

DESCRIPTION OF THE PREFERRED EMBODIMENT

Figure 3:
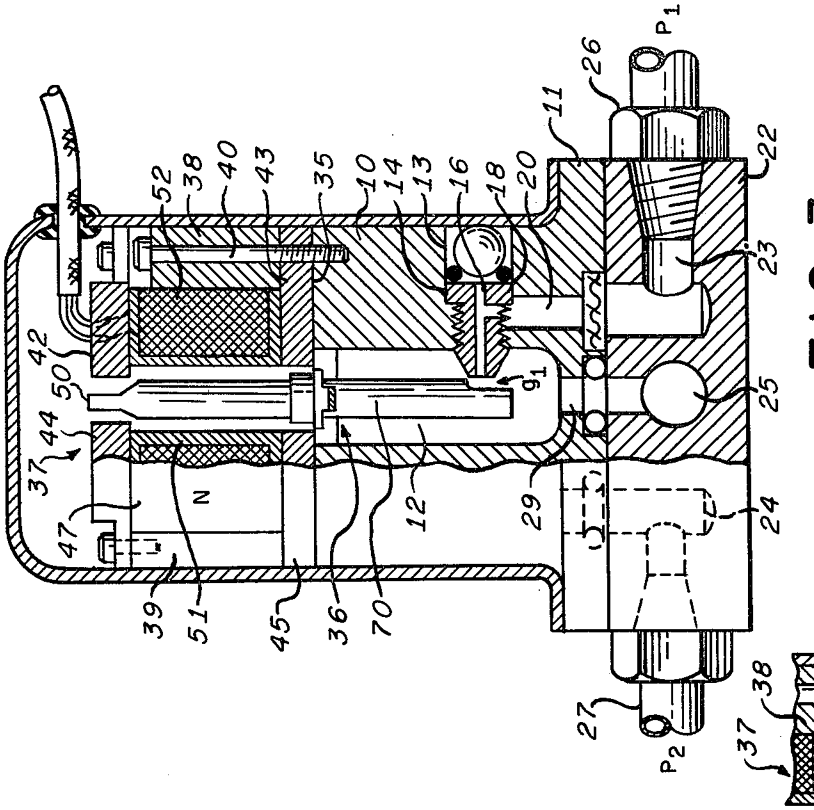
FIGS. 2 and 3 are cross-sections of the valve taken in the planes defined by lines 2—2 and 3—3 of FIG. 1 and illustrating the structural details of the valve.
Figure 5:
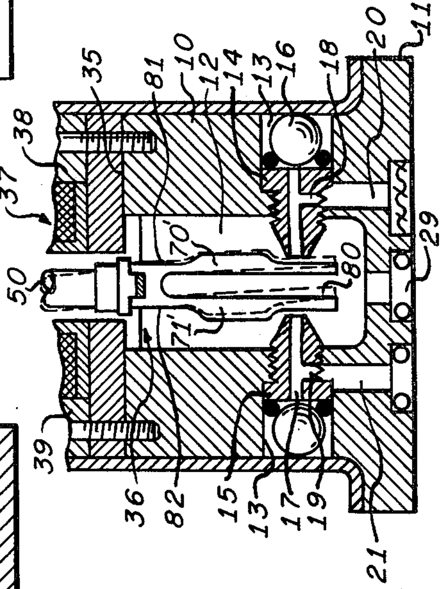
Figure 2:
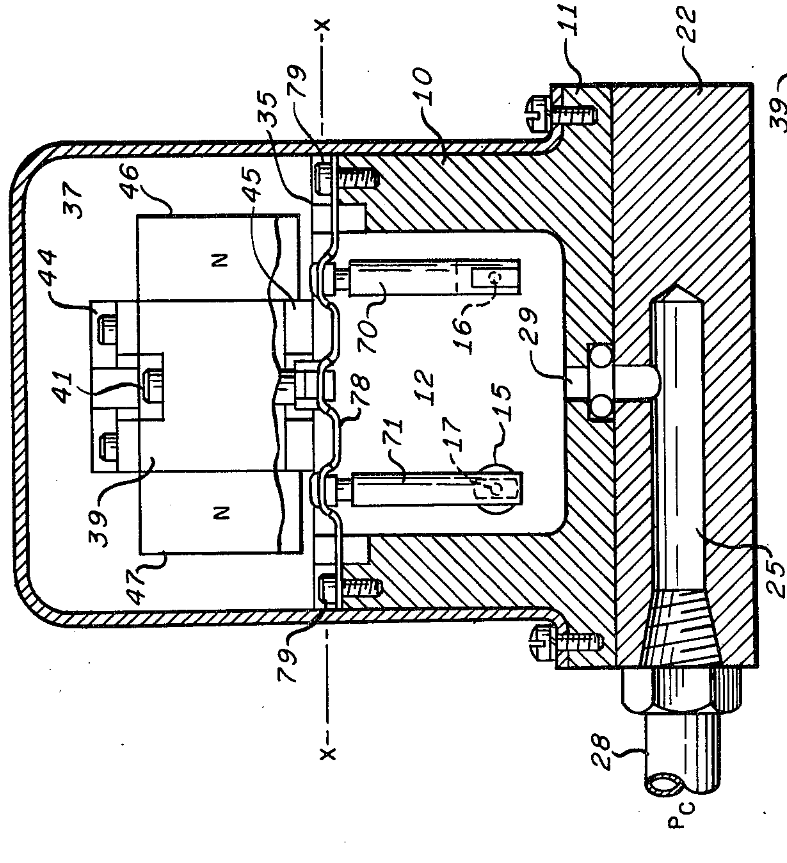

The over-all structure of the valve housing, pneumatic passages, and flapper torque motor or actuator structure are, in general, conventional. Referring now to FIGS. 2, 3, and 5, these structures will first be described.

Generally, the valve comprises a housing 10, which may be a casting or machined from suitable bar stock, having a mounting flange 11 and a generally vertically elongated internal chamber 12 formed therein, this chamber constituting at least a part of the load volume, the internal pressure of which is to be controlled. The housing side walls include laterally extending holes 13 suitably tapped at their inner ends and receive threaded nozzles 14 and 15 (see FIG. 5 for example), the tapered ends of which extend into the chamber 12. Each nozzle fitting 14 and 15 is sealed in housing 10 by means of an O-ring and a ball suitably bonded in the external end of holes 13. Each nozzle is centrally longitudinally drilled to provide orifices 16 and 17 and laterally drilled as at 18 and 19 to provide communication with suitable holes 20 and 21 drilled in housing 10 and adapted in turn to communicate with first and second sources of pressure $P_1$ and $P_2$ (not shown). This communication is provided by a valve support base member 22 to which the valve is secured as by suitable screws (not shown) extending through the flange 11 and into the base 22. The base member 22 includes drilled holes 23, 24, and 25 suitably tapped at their external ends to receive pneumatic lines and fittings 26, 27 and 28 respectively connected to pressure sources $P_1$ and $P_2$ and to the controlled pressure load volume $P_c$ or accumulator (not shown). The controlled volume communicates with the valve chamber 12 through a hole 29 in the housing 10. Sealing O-rings, filters and the like are provided in accordance with accepted practice. The top surface 35 of housing 10 is adapted to provide a support for the flapper and armature assembly 36 and the electric torque motor or flapper actuator assembly 37.

Figure 1:
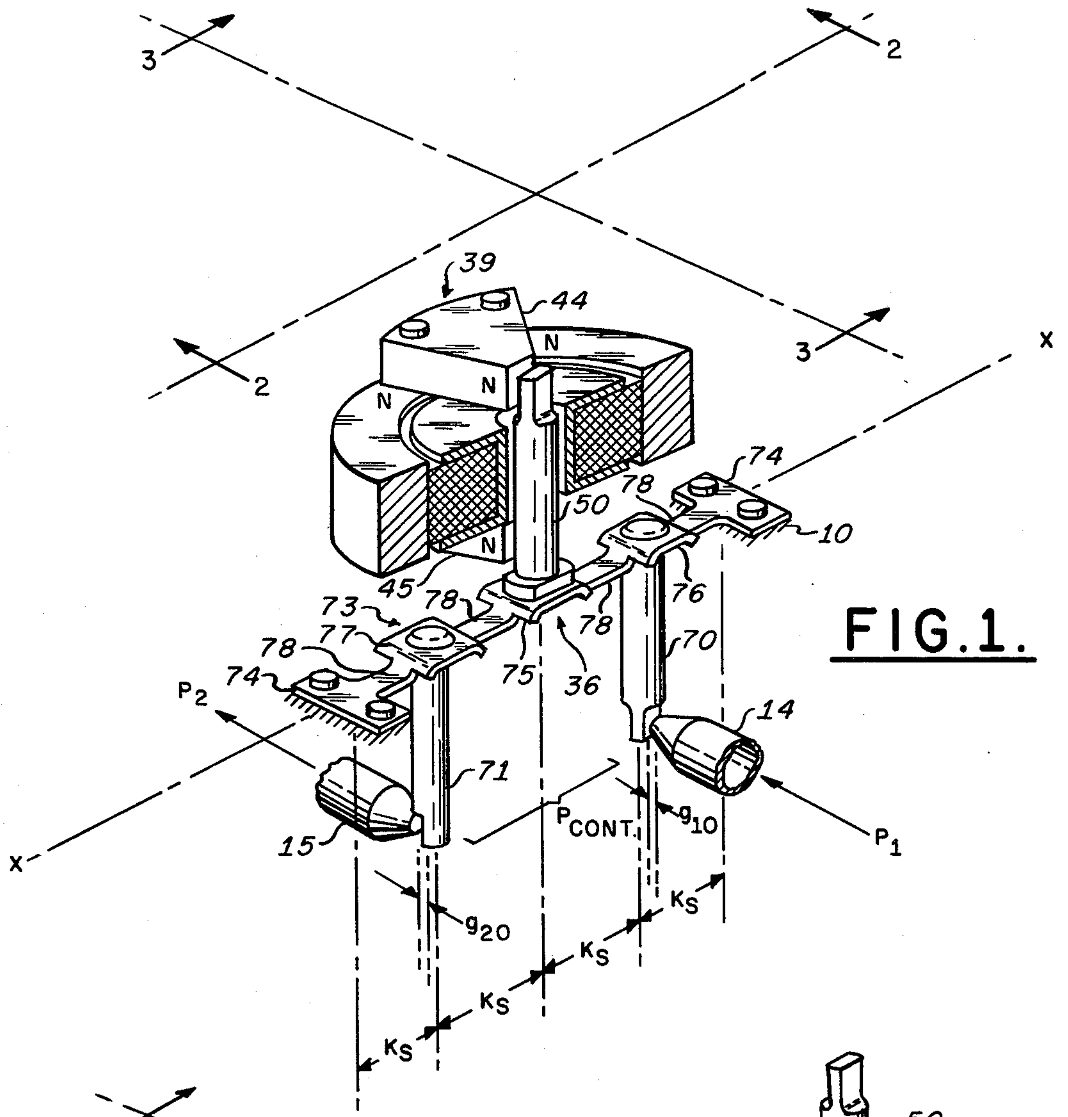
FIG. 1 is a schematic perspective view of the basic elements of the control valve of the present invention illustrating their general cooperative relationship.

In general, the torque motor 37 is an electromagnetic structure and comprises a permanent magnetic circuit consisting of two generally U-shaped pole pieces 38 and 39 of ferromagnetic material secured to the top of housing 10 as by screws 40 and 41 and oriented to lie generally centrally about a plane coincident with or parallel to the plane or planes (to be described below) including the nozzles 14 and 15. Each pole piece 38 and 39 includes upper and lower poles 42 and 43, 44 and 45, respectively. Each pole piece 38 and 39 are magnetized by arcuate shaped permanent magnets 46 and 47 extending from pole piece to pole piece with their like polarity ends abutting each pole piece. Thus, as shown in FIGS. 1, 2, and 3, the pole piece 38 is magnetized as a south pole and the pole piece 39 is magnetized as a north pole. The upper and lower poles 42, 43, and 44, 45 are so shaped as to define relatively small upper and lower gaps of concentrated magnetic flux. An elongated armature 50 is resiliently supported (as will be described below) on the top of housing 10 for pivotal movement about an axis normal to the plane including the pole pieces 38 and 39 and extends between the gaps formed by the poles 42, 43 and 44 and 45. The armature 50 is fabricated from magnetizable material. Also extending between these upper and lower pole pieces is an annular spool 51 carrying an electric coil 52 which is connected to a suitable valve control amplifier which may be part of the servo control loop disclosed in the above-mentioned patent application. The operation of the torque motor 37 will now be evident. When an electric current is passed through coil 52 in one direction, it will polarize armature 50 so that its upper end is say a north pole and its lower end a south pole. The upper end will therefore move toward the upper south pole 42 and be repelled away from the upper north pole 44. The lower end of armature 50 is very close to the armature pivot point and therefore due to its short lever arm will not substantially contribute to armature movement. The opposite movement occurs with a reversal of the current in coil 52.

Figure 6:
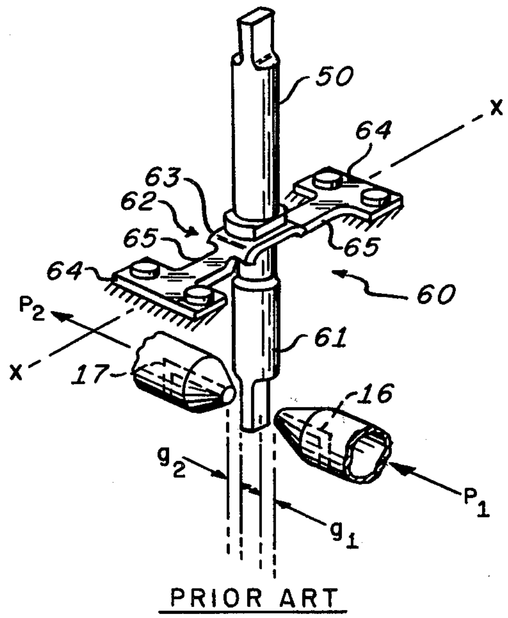
PRIOR ART FIG.6.
FIG. 6 is a schematic perspective view of the flapper-nozzle configuration of a typical prior art flapper type control valve.

The valve structure described up to this point is generally conventional and before proceeding further with a description of the improved valve of the present invention which primarily concerns the flapper/nozzle/-gap configuration, the structure so far described may be used to describe a typical prior art flapper valve, reference being made primarily to FIGS. 3, 5 and 6. For this purpose, first consider the prior art flapper/armature assembly 60 of FIG. 6. It comprises the armature 50 (as in FIGS. 3 and 5) a single, rigid flapper arm 61, and a resilient mounting member 62. The mounting member 62 is fabricated from flat spring material, such as beryllium copper, and comprises a central flange 63 and end flanges 64 interconnected by reduced width connecting portions 65. The armature 50 and flapper 61 are rigidly secured to the central flange 63 as by a suitable internal screw and/or epoxy fastening, while the end flanges 64 are rigidly securable to the top of the housing 10. The flat configuration of member 62 provides rigidity of the assembly and translational movement in the plane including the magnetic poles of the torquer 37. However, the flat reduced portions 65 permit resilient torsional or pivotal movement of the armature 50 and flapper 61 about the axis *x—x*.

Now assume that the armature assembly just described (FIG. 6) is assembled into the housing 10 of FIG. 5 in place of the armature/flapper assembly shown therein, the nozzles 14 and 15 separated somewhat, as illustrated by the gap *g* in FIG. 6, and the orifices 16 and 17 reduced somewhat in size as by the dotted lines of FIG. 6. The resulting structure will constitute a typical prior art flapper valve.

A typical functioning of such a prior art valve may be described in connection with the air data test equipment disclosed in the above-referenced patent application. The pressure lines 26 and 27 are connected to two sources of pressure $P_1$ and $P_2$, for example, $P_1$ may be a source of positive pressure such as a compressed air or compressed dry nitrogen tank or a pressure pump while $P_2$ may be a source of negative pressure such as a vacuum pump, the "positive" and "negative" being relative to for example a standard atmosphere. The output pressure line $P_c$ is connected to a load volume which in turn is connected to the pneumatic apparatus under test. In this application, the diameter of the $P_1$ nozzle orifices might be on the order of 0.025 in., the diameter of the $P_2$ nozzle orifice might be on the order of 0.040 in. and the total gap $g$ (FIG. 6) is such that the effective flapper stroke might be on the order of 0.008 in.

Assume that the test system is supplying a pressure corresponding to sea level and that now it is desired to command the pressure change at a high rate and thereafter maintain a test pressure in the load volume corresponding to say, 40,000 feet of altitude. The command signal applied to coil 52 drives the flapper 60 against the spring pivot 65 hardover closing or substantially closing port 16 to positive pressure source $P_1$ and opening wide port 17 to source $P_2$, the vacuum pump, and as a result the pressure in load volume begins to decrease at a maximum rate determined by the capacity of the vacuum pump, the orifice diameter and the maximum available flapper/orifice gap. As the volume pressure approaches the 40,000 foot pressure, the control system reduces the current supplied to coil 52 and the flapper begins to move back toward the vacuum orifice 17 under the influence of the resilient spring pivot 65. When the desired 40,000 foot pressure is achieved, the flapper 61 is maintained at a position such as to maintain that pressure. With the orifice 17 diameter and the flapper stroke examples given above, it is necessary for the vacuum pump to continuously withdraw a substantial volume of air or gas through the valve in order to maintain the commanded pressure, i.e., this valve configuration requires a large quiescent or wasted mass flow to maintain the commanded pressure. Furthermore, if the test system were required to drive larger test volumes at greater pressure rates using the prior art valve design, the orifices 16, 17 and/or the flapper stroke would have to be increased to handle this increased transient mass flow. However, while the transient mass flow may be increased by so changing the prior art valve parameters, the mass flow under steady state or quiescent volumetric pressure (wasted mass flow) would correspondingly increase and require a higher capacity vacuum pump to maintain it. Thus, the prior art valve design just described is very limited in its application, particularly in its application to aircraft pneumatic test equipment and indeed in other pneumatic or hydraulic systems where it is desired to reduce to a minimum quiescent or wasted mass flow.

The improved pneumatic control valve of the present invention overcomes the above-described wasted mass flow problem by a unique configuration of the flapper/nozzle/gap elements, reference now being made particularly to FIGS. 1, 2 and 3 which illustrates one preferred embodiment thereof. In this embodiment, the over-all valve configuration is similar in many respects to the prior art configuration except that instead of the nozzles 14 and 15 being coaxially disposed with a single flapper disposed in the gap defined thereby, two flappers 70 and 71 are provided and are each offset along their pivot axis $x$—$x$ and their respective nozzles 14 and 15 are correspondingly offset. This, of course, requires an elongation of the valve housing 10, internal chamber 12, base member 22, etc., as shown in FIG. 2. Both flappers are resiliently coupled with the housing 10 and with a common drive armature 50 along the pivot axis $x$—$x$. The configuration of the flapper/armature assembly 36 is clearly shown in FIG. 1 and includes a resilient mounting member 73 fabricated from beryllium-copper, for example, and having end flanges 74, a central flange 75 and spaced flanges 76, 77, all connected together by reduced width connecting portions 78. The widths of each of these portions is selected so as to have a predetermined common spring constant $K_s$ with respect to pivotal forces about the $x$—$x$ axis. The common armature 50 is rigidly secured to central flange 75 and flappers 70 and 71 are rigidly secured to intermediate flanges 76 and 77 respectively. End flanges 74 are rigidly secured to suitable cutouts in the top of housing 10 as by means of screws 79. The flat configuration of the resilient mounting means 73 provides lateral rigidity of the armature/flapper assembly relative to the pivot axis $x$—$x$.

The electric torque motor and armature means thus drives both flappers 70, 71 about axis $x$—$x$ through resilient coupling 78 in response to electric signals supplied to the coil 52 in the manner described above. The nozzles 14 and 15, connected respectively with pressure sources $P_1$ and $P_2$ through the passages 23 and 24, extend into the chamber 12 and terminate adjacent the flattened lower ends of the flappers 70 and 71, respectively, and thereby define respective gaps $g_1$ and $g_2$. The internal chamber 12 is part of the controlled volume $P_c$ through passages 25, 29 and conduits 28.

The dual flapper/nozzle configuration of the present invention provides an additional design parameter that allows a substantial increase in the transient mass flow to the load volume while at the same time permitting the maintenance of a quiescent or steady state pressure in the volume with a greatly reduced wasted mass flow. In general, this is accomplished in the new design by providing two flappers actuated by a common armature through a resilient coupling whereby in response to a small electric signal both flappers move as one, opening and closing their respective nozzles proportionally. However, for large electric signals (large pressure rate command), one flapper abuts and closes its associated nozzle orifice while the other flapper continues to further open its nozzle in response thereto by reason of the resilient coupling between the flappers and the armature. This flapper/armature design gives rise to further improved design characteristics. It allows the nozzle orifice diameters to be greatly increased and the quiescent flapper/nozzle gaps $g_{10}$ and $g_{20}$ to be greatly decreased and still provide increased transient mass flow when so commanded. The substantial decrease in the gap dimensions greatly reduces the mass flow under steady state pressure commands. Furthermore, the substantial decrease in gap dimension results in greatly increasing the response or gain of the valve. Furthermore, the greatly reduced gaps at low or near zero commands lend to the valve the characteristics of an integrator. For example, in comparison with the parameters given above with respect to the prior art valve of FIG. 6, the corresponding parameters for the valve of the present invention are as follows: the $P_1$ (hi pressure) nozzle orifice area is 0.056 in.; the $P_2$ (lo pressure) nozzle orifice area is 0.090 in.; the quiescent gaps $g_{10}$ and $g_{20}$ are each equal to or less than 0.001 in. and due to the resilient coupling between the flappers, each one may be opened to a transient gap of say 0.014 in. thereby providing a desired maximum transient flow rate for the flight line demand (corresponding to a predetermined maximum electric signal).

Assuming the same test example as described above with respect to the prior art valve of FIG. 6, the improved valve of the present invention will operate as follows. In response to the 40,000 foot pressure command at a rate of say 60,000 ft./min., a large electric signal is applied to torque motor coil 52 polarizing armature 50 such that it moves toward the north pole piece 44, initiating a rotation of both flappers 70 and 71 in a counterclockwise direction as viewed in FIGS. 1 and 3 against the resilient coupling 78 between the housing 10 and the flanges 76 and 77. Since there is no initial contact between either nozzle 14, 15 and its flapper 70, 71, both flappers move together. Such movement in turn begins to close gap $g_1$ connected to hi pressure source $P_1$ and to open gap $g_2$ connected to pressure (vacuum) source $P_2$, whereby to begin to reduce the pressure in valve chamber 12 and in the load volume. Since a large pressure rate is commanded and a correspondingly large electric signal applied to coil 52, and by reason of the very small gap $g_1$, the flapper 70 substantially immediately contacts nozzle 14 closing off pressure source $P_1$ completely. However, due to the resilient coupling 78 between flapper 70 and armature 50, the armature 50 continues to rotate in the counterclockwise direction causing a corresponding continued movement of flapper 71 away from nozzle 15 further opening its gap $g_2$ and producing a greater mass flow to low pressure source $P_2$, i.e., the vacuum pump. This large gap opening coupled with the large area of the vacuum nozzle 15 results in a very rapid reduction in pressure in the load volume (for example, a very rapid withdrawal of gas from the aircraft pneumatic system under test). As the load volume pressure approaches that corresponding to the commanded 40,000 feet of altitude, the electric control signal begins to reduce in magnitude and armature 50 begins to move away from pole piece 44 toward its neutral position, which in turn begins to allow flapper 70 to move back towards its nozzle 15 under the influence of its spring mount 73. When the pressure in the load volume reaches its commanded pressure, the flappers 70 and 71 will return to a position within their linear range, with the pressure ports 15 and 14 open just sufficiently to maintain the load pressure at the steady state pressure commanded. However, since the quiescent gaps $g_{10}$ and $g_{20}$ are now so small, the gas mass flow required to maintain the load pressure will be very very low. As stated, the very small gap required to maintain the commanded load pressure provides an integrator effect.

From the foregoing, it will be appreciated that with the valve of the present invention, the vacuum pump may be sized to satisfy the maximum transient pressure rate and the test volume to be serviced rather than sized to accommodate the mass flow required to maintain a quiescent or steady state test pressure. Also, the very low quiescent mass flow is particularly economically desirable where the gas being employed is expensive. For example, dry nitrogen is often used in testing aircraft air data sensor systems.

Figure 4:
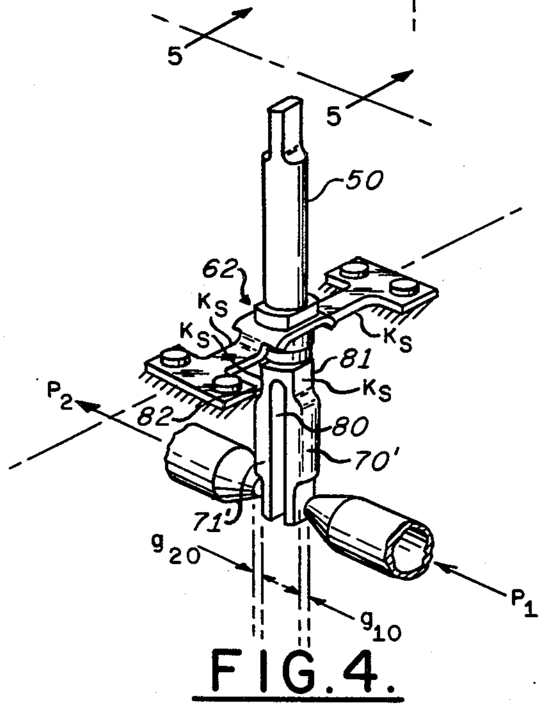
FIGS. 4 and 5 are views similar to FIGS. 1 and 3 illustrating schematically and in structural detail respectively a modification of the valve of the present invention.

In FIGS. 4 and 5 there is illustrated a preferred modification of the valve of the present invention. In this modification, the prior art valve described with respect to FIG. 6 requires only a slight change, viz, a change in the flapper configuration and a change in the nozzle orifice dimensions. In this modification, the internal chamber may be slightly widened and the flapper 61 of FIG. 6 bifurcated as at 80, as shown in FIGS. 4 and 5 to provide two flappers or tines 70' and 71' joined at their upper ends to provide resilient couplings 81 and 82 with respect to the armature 50. Thus, the two flapper means have a configuration similar to a tuning fork. If necessary, the upper portions of the bifurcated flapper may be machined to form flattened surfaces at the junction of the two flappers 70' and 71' to provide the required resiliency or spring constant $K_s$. The spring constants of the mounting flexure 62 should be a similar value $K_s$, as in connection with the configuration of FIG. 1. In the modification of FIGS. 4 and 5, the nozzles 14 and 15 are of course coplanar and diametrically aligned in the housing 10 and are so spaced as to provide the required very small quiescent gaps $g_{10}$ and $g_{20}$ as in the example given with respect to FIG. 1 which the diameters of the nozzle orifices is increased to correspond to those of the example of FIG. 1.

The operation of the modification of FIGS. 4 and 5 is the same as the valve of FIGS. 1, 2 and 3. When commanded by the same large electric signal as described in connection with FIG. 1, the one flapper 70' will contact the nozzle 14, closing its orifice to pressure source $P_1$ and the armature 50 will continue to move flapper 71' away from its orifice further opening the same by reason of the resilient coupling 81, 82 between flappers 71' and 70' as indicated by the dotted line positions in FIG. 5.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A signal responsive fluid pressure control valve for providing a controllable output pressure from first and second input pressure sources proportional to an electrical control signal with minimum fluid mass flow comprising a valve housing including a controlled pressure chamber, a first nozzle connected with said first pressure source and extending into said chamber, a second nozzle connected with said second pressure source and extending into said chamber, first and second flapper means adjacent said first and second nozzles respectively and defining first and second gaps therebetween, said flapper means being adapted to be moved relative to said nozzles to increase and decrease said gaps and thereby control the resultant pressure within said chamber in accordance with the relative positions of said flapper means, electric torque motor and armature means adapted to move said flapper means in accordance with said electrical control signal, and resilient means coupling each of said flapper means with said housing and with said armature means, said resilient means providing simultaneous movement of both of said flapper means by said armature means to simultaneously increase one of said gaps and decrease the other, and providing independent movement of one of said flapper means by said armature means when the gap defined by the other thereof is decreased to zero.

2. The pressure control valve as set forth in claim 1 wherein said resilient means comprises first spring support means coupling said first and second flapper means and said armature means with said housing, and second spring support means coupling said first and second flapper means with said armature means.

3. The pressure control valve as set forth in claim 2 wherein said first and second spring support means have substantially the same spring constant.

4. The pressure control valve as set forth in claim 2 wherein said first spring support means defines a pivot axis for pivotally supporting said first and second flapper means and said armature means on said housing for restrained rotation about said axis.

5. The pressure control valve as set forth in claim 4 wherein said first and second spring support means are substantially collinear and extend along said pivot axis, wherein said first and second flapper means are spaced apart along said axis and said first spring means resiliently couples said flapper means to said housing, and wherein said armature means is spaced between said first and second flapper means and said second spring support means resiliently couples said armature means with said first and second flapper means.

6. The pressure control valve as set forth in claim 5 wherein said first and second spring support means have substantially the same spring constant.

7. The pressure control valve as set forth in claim 4 wherein said armature means and said first and second flapper means are supported on said first spring means and extend in opposite directions therefrom along an axis normal to said pivot axis, said first and second flapper means comprising a pair of spaced tines, the free ends located opposite each of said first and second nozzles and the opposite ends thereof being resiliently connected together adjacent the first spring means, said resilient connection constituting said second spring means.

8. The pressure control valve as set forth in claim 7 wherein said first and second flapper means comprises a tuning fork like structure.

9. The pressure control valve as set forth in claim 1 wherein said first and second gaps are very small relative to the range of simultaneous movement of both of said flapper means whereby to minimize fluid mass flow for all substantially steady state positions of said flapper means.

* * * * *